(12) United States Patent
Oh et al.

(10) Patent No.: US 9,580,105 B2
(45) Date of Patent: Feb. 28, 2017

(54) UNDER-FLOOR FRAME SYSTEM FOR VEHICLE

(71) Applicant: Hyundai Motor Company, Seoul (KR)

(72) Inventors: Se Hee Oh, Daejeon (KR); Ha Rim Choi, Gyeonggi-do (KR); Gi Hwan Kim, Gyeonggi-do (KR); Chi Hoon Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 44 days.

(21) Appl. No.: 14/496,295

(22) Filed: Sep. 25, 2014

(65) Prior Publication Data

US 2015/0251699 A1 Sep. 10, 2015

(30) Foreign Application Priority Data

Mar. 4, 2014 (KR) .......................... 10-2014-0025758

(51) Int. Cl.
| | |
|---|---|
| *B62D 21/02* | (2006.01) |
| *B60R 19/03* | (2006.01) |
| *B62D 29/04* | (2006.01) |
| *B62D 25/20* | (2006.01) |

(52) U.S. Cl.
CPC .............. *B62D 21/02* (2013.01); *B60R 19/03* (2013.01); *B62D 25/20* (2013.01); *B62D 29/041* (2013.01)

(58) Field of Classification Search
CPC ...... B62D 21/02; B62D 29/041; B62D 25/20; B60R 19/03
See application file for complete search history.

(56) References Cited

U.S. PATENT DOCUMENTS

| | | | |
|---|---|---|---|
| 6,296,301 B1 | 10/2001 | Schroeder et al. | |
| 7,032,958 B2 * | 4/2006 | White | B62D 23/00 296/181.1 |
| 7,125,067 B2 | 10/2006 | Bonnett et al. | |
| 7,503,576 B1 | 3/2009 | Schroeder | |
| 2013/0313862 A1 * | 11/2013 | Yamaji | B62D 25/025 296/203.01 |

FOREIGN PATENT DOCUMENTS

| | | |
|---|---|---|
| JP | 60-229181 B2 | 10/1985 |
| JP | H10507983 A | 8/1998 |
| JP | 2010-149511 A | 7/2010 |
| JP | 2012-171533 A | 9/2012 |
| KR | 10-2006-0011173 A | 2/2006 |

\* cited by examiner

*Primary Examiner* — Glenn Dayoan
*Assistant Examiner* — Melissa A Black
(74) *Attorney, Agent, or Firm* — Mintz Levin Cohn Ferris Glovsky and Popeo, P.C.; Peter F. Corless

(57) ABSTRACT

An under-floor frame system for a vehicle is provided that includes a main frame of carbon fiber composite materials that forms a closed quadrangle. A front of the main frame is a front bumper member, both sides are side members that extend from a front to a rear of the main frame, and a rear of which is a rear bumper member. A front cross member of carbon fiber composite materials extends along with a width direction of a vehicle, and connects the front portion of both side members of the main frame and a rear cross member which connects the rear portion of the side members. An additional side member of carbon fiber composite materials extends in the length direction of a vehicle, and is connected to the side member of the main frame.

6 Claims, 5 Drawing Sheets

UNDER-FLOOR FRAME SYSTEM FOR VEHICLE

CROSS REFERENCE TO RELATED APPLICATION

The present application claims priority to Korean Patent Application No. 10-2014-0025758, filed on Mar. 4, 2014, the entire contents of which is incorporated herein for all purposes by this reference.

BACKGROUND (a) Technical Field

The present invention relates to an under-floor frame system for a vehicle that increases the rigidity and reduces weight by using a carbon fiber composite material.

(b) Background Art

Generally, a floor side/cross member, a center/rear floor and a side seal/side member, which are manufactured separately, are welded separately to manufacture a conventional Steel BIW under-floor frame, and a connection cross member is formed with an open-sectional surface. In particular, a connection portion of the center/rear floor is cut (e.g., divided) and thus the number of the members for configuring a connection structure increases and an opening portion member is formed partially with an open-sectional surface (e.g., close-sectional surface is cut) and thus a floor member is connected discontinuously, thereby causing discontinuous rigidity and weakening durability thereof. Further, multiple members are required to connect a side seal/side member/cross member and further substantial deformation may occur due to the open-sectional surface of the cross member when a side collision of a vehicle occurs.

The description provided above as a related art of the present invention is merely for aiding in understanding the background of the present invention and should not be construed as being included in the related art known by those skilled in the art.

SUMMARY

According to an aspect of the present invention, an under-floor frame system for a vehicle may include: a main frame formed of carbon fiber composite materials to form a closed quadrangle shape, a front of which may be a front bumper member, both sides of which may be side members running from a front to a rear of the main frame (e.g., extending from a front to a rear of the main frame), and a rear of which may be a rear bumper member; a front cross member formed of carbon fiber composite materials may extend along with a width direction of a vehicle, and connect the front portion of both side members of the main frame and a rear cross member which may connect the rear portion of the side members; and an additional side member formed of carbon fiber composite materials may extend in the length direction of a vehicle, and may be connected to the side member of the main frame.

A rear end of the additional side member may extend along the rear bumper member of a main frame, and form an additional rear member formed of carbon fiber composite materials. The additional side member may be provided as a pair and the rear end of each additional side member may be connected through the additional rear member formed of carbon fiber composite materials, or formed integrally. The additional side member may be connected to the outer end of the side member.

The additional rear member may be connected in close contact (e.g., adjacent) along the lower end of the rear bumper member. A spring sheet on which a rear wheel suspension spring is seated may be connected to the lower end of the additional rear member. In addition, a spring sheet on which a rear wheel suspension spring is seated may be connected to the lower end of the additional rear member where the additional rear member and the rear bumper member are connected. The lower end of a C filler member formed of carbon fiber materials may be connected to the upper end of the rear bumper member that corresponds to the spring sheet.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
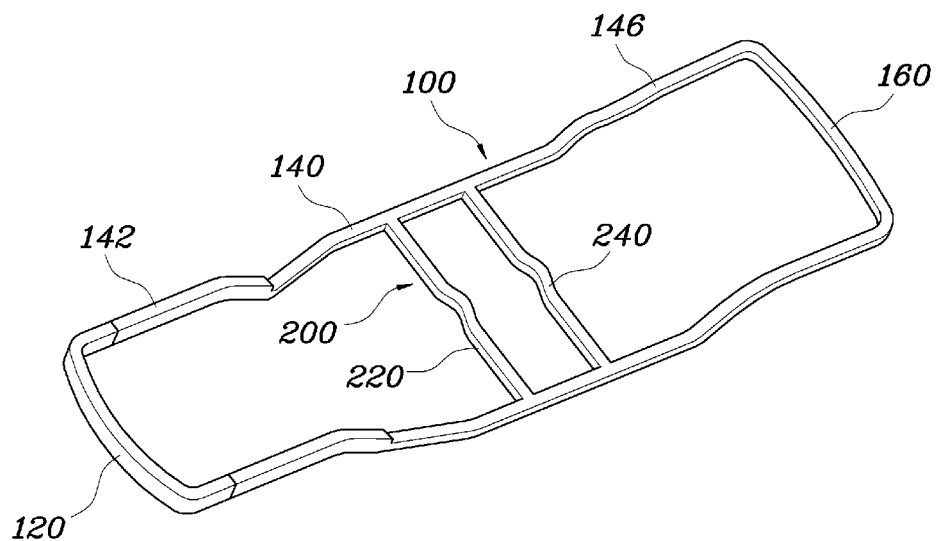
FIG. 1 is an exemplary view illustrating a main frame of an under-floor frame system for a vehicle according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
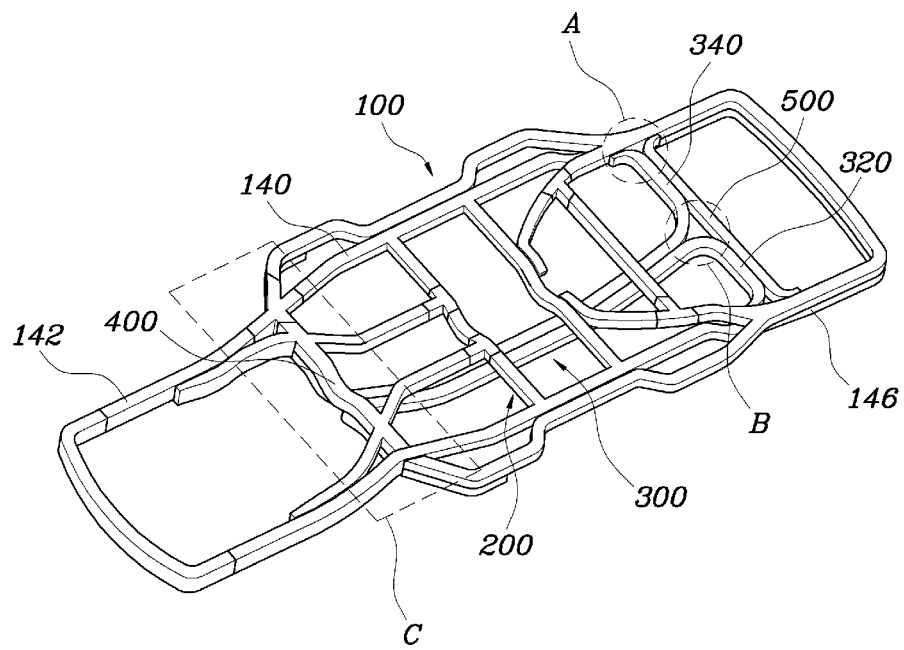
FIG. 2 is an exemplary bottom view illustrating an under-floor frame system for a vehicle according to an exemplary embodiment of the present invention.
Figure 3:
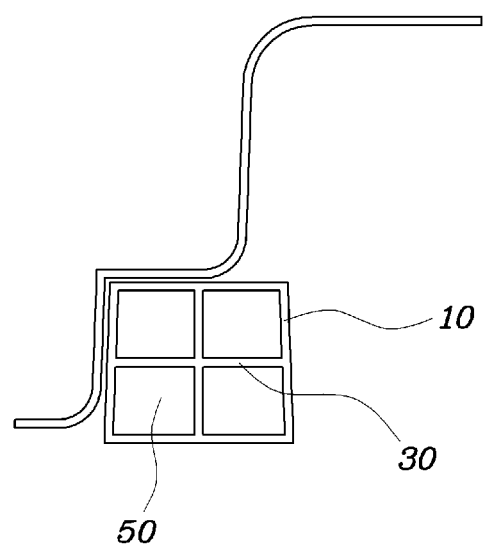
FIG. 3 is an exemplary cross-sectional view illustrating a member of an under-floor frame system for a vehicle according to an exemplary embodiment of the present invention.
Figure 4:
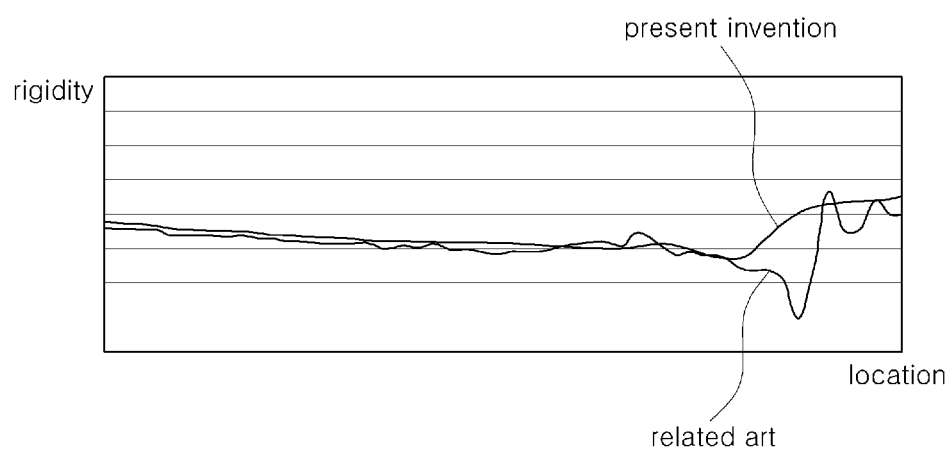
FIG. 4 is an exemplary graph illustrating the effects of an under-floor frame system for a vehicle according to an exemplary embodiment of the present invention.

Hereinafter, an under-floor frame system for a vehicle is described with reference to the accompanying drawings according to an exemplary embodiment of the invention. FIG. 1 is an exemplary view illustrating a main frame of an under-floor frame system for a vehicle according to an exemplary embodiment of the present invention, FIG. 2 is an exemplary bottom view illustrating an under-floor frame system for a vehicle according to an exemplary embodiment of the present invention, FIG. 3 is an exemplary cross-sectional view illustrating a member of an under-floor frame system for a vehicle according to an exemplary embodiment of the present invention, and FIG. 4 is an exemplary graph illustrating the effects of an under-floor frame system for a vehicle according to an exemplary embodiment of the present invention.

An under-floor frame system for a vehicle according to an exemplary embodiment of the present invention, which may be formed of carbon fiber composite materials, may include: a main frame 100 having four members integrally connected to form a closed quadrangle, wherein a front of the main frame 100 may be a front bumper member 120, both sides of which may be side members 140 that extend from a front to a rear of the main frame 100 and a rear of is the main frame 100 may be a rear bumper member 160; and a center cross member 200 integrally formed with the main frame 100, may extend along with a width direction of a vehicle, and connect the middle of the both side members 140.

According to the present invention, as shown in FIG. 1, the one-piece type main frame 100 and the center cross member 200 may be provided to ensure continuous rigidity of an under-floor frame system for a vehicle. In particular, the under-floor frame system for a vehicle of the present invention may have members integrally formed of carbon fiber composite material as main elements. The main frame 100 may operate as an under-floor frame system for a vehicle wherein the four members may be connected integrally to form a closed quadrangle.

Basically, the under-floor frame system for a vehicle of the present invention may be formed of carbon fiber composite materials and thus the freedom degree of a shape may increase and the edges of a vehicle frame forming a floor of a vehicle may be formed as a quadrangle, and as a result, the rigidity may further increase compared to a conventional under-floor frame system. In particular, the front of a quadrangular main frame 100 may be the front bumper member 120, both sides thereof may be side members 140 that extend from a front to a rear of the main frame, respectively, and a rear thereof may be the rear bumper member 160. Further, a center cross member 200 may be integrally formed with the main frame 100 and may extend along with a width direction of a vehicle and connect the middle of the both side members 140.

FIG. 2 is and exemplary bottom view illustrating an under-floor frame system for a vehicle and according to an exemplary embodiment of the present invention, wherein the center cross member 200 may be provided as a pair of a front center cross member 220 and a rear center cross member 240 may be spaced at a predetermined distance from each other.

Meanwhile, a front cross member 400 and a rear cross member 500 may be formed with carbon fiber composite materials to extend along a width direction of a vehicle and connect a front side member portion 142 and a rear side member portion 146 at both sides of the main frame 100, respectively. Further, a center tunnel member 300 may be formed of carbon fiber composite materials to be extended in a width direction of a vehicle and may connect the front cross member 400 and the rear cross member 500.

In summary, the end of the center tunnel member 300 may be divided into two strands at a side of the front cross member 400 or the rear cross member 500, and the respective divided ends 320, 340 may be in close contact with (e.g., adjacent to) the front cross member 400 or the rear cross member 500 to be extended in the same direction thereof. Additionally, the divided ends of the center tunnel member 300 may be connected to the side member 140 of the main frame 100, wherein the side member 140, the divided ends 320, 340 of the center tunnel member 300, and the end of the corresponding front cross member 400 or the rear cross member 500 may be connected, leaving a triangular space A therebetween. The respective member may be a side of a triangle, leaving a triangular space therebetween, to increase the rigidity of a connection portion.

Further, the divided point of the center tunnel member 300 may form a triangular space B together with the corresponding front cross member 400 or the rear cross member 500 to increase the rigidity. In particular, the end of the center tunnel member 300 may be divided into two strands at a side of the rear cross member 500 and the respective divided ends 320, 340 may be in close contact with (e.g., may touch or be adjacent to) the rear cross member 500 to be extended in the same direction thereof to be connected to the side member 140 of the main frame 100, wherein the side member 140, the divided end of the center tunnel member 300, and the end of the rear cross member 500 may be connected to each other, forming a triangular space A therebetween.

In particular, as shown in the drawings, the center tunnel member 300 may include two strands extended in parallel and in close contact and each strand may be divided at a side of the front cross member 400 or at a side of the rear cross member 500 to be in close contact and to be extended in the same direction thereof. Under this configuration, the center cross member 200 is not divided but may be continuous to increase the rigidity.

Meanwhile, as shown in FIG. 2, the center tunnel member 300 may be extended to run through an upper space of the center cross member 200. Further, the respective members may be formed of carbon fiber composite materials, and may be constructed of a skin 10 forming a quadrangular edge, an inner partition 30 dividing an inner space defined by the skin 10 into a matrix type, and a filler 50 of the carbon fiber composite materials to be filled in the partitioned space, as shown in FIG. 3.

FIG. 4 is an exemplary graph illustrating the results of evaluating the rigidity at the part C of FIG. 2, wherein it is shown that the variation of the rigidity according to the present invention is continuous since a continuous closed-sectional structure is accomplished more sufficiently at a connection portion among the members as compared to a conventional framed made of steel.

Figure 5:
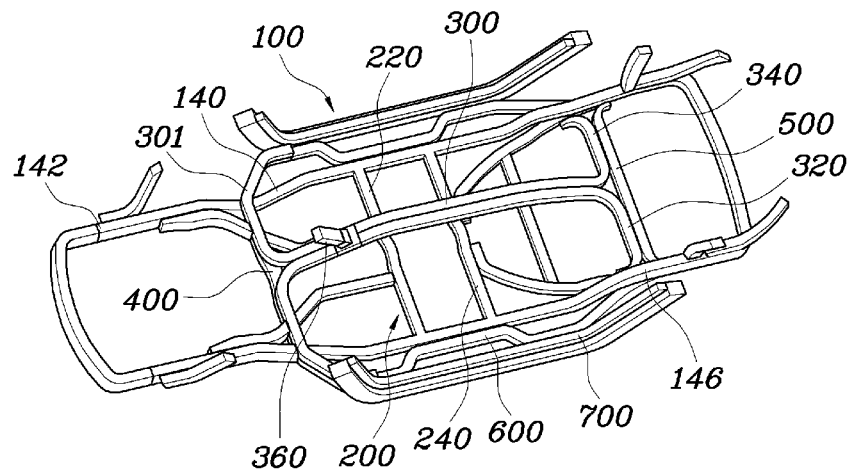
FIG. 5 is an exemplary top view illustrating an under-floor frame system for a vehicle according to an exemplary embodiment of the present invention.
Figure 6:
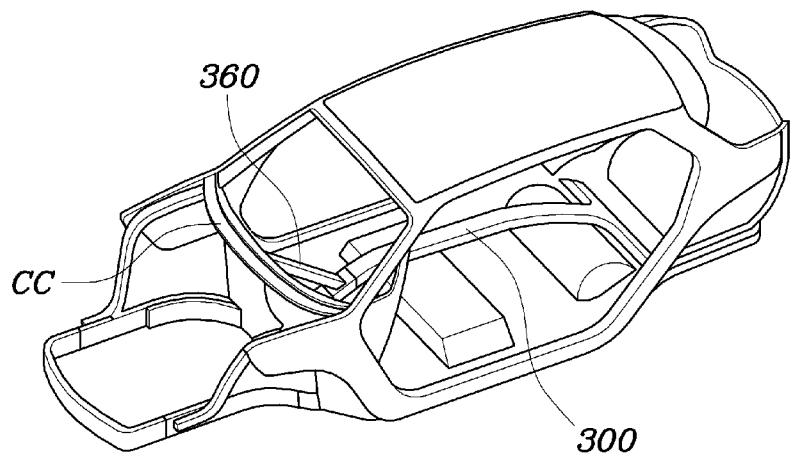
FIG. 6 is an exemplary view illustrating an under-floor frame system adapted in a vehicle according to an exemplary embodiment of the present invention.

Further, as shown in FIG. 5, an additional side member 600 and a door seal member 700 may be disposed at the outer side of a vehicle and may be made of carbon composite materials. In particular, the additional side member 600 may be extended in the length direction of a vehicle to be connected to the side member 140 of the main frame 100. Additionally, the door seal member 700 may be formed of carbon composite materials to be connected to an outer end of the additional side member 600. The divided end 301 of a front end of the center tunnel member 300 may be connected to the front cross member 400, the side member 140, the additional side member 600, and the door seal member 700. Further, the divided end of a rear end of the center tunnel member 300 may be connected to the rear cross member 500 and the additional side member 600. Through this configuration a torsional stiffness of a vehicle may be substantially increased.

Meanwhile, a front end of an additional side member 600 may be extended to be connected to the front cross member 400 via the side member 140, and may further include a support member 360 divided upwardly to be extended at a center tunnel member 300 and may be connected to a cowl cross member CC. A torsional stiffness of a vehicle may be increased through the support member 360. In other words, the center tunnel member 300 and the cowl cross member CC may be connected through the support member 360 by forming a particular shape that the center tunnel member 300 runs over the center cross member 200, thereby increasing additionally the rigidity.

The below table shows a comparison of stiffness between the cases where the center tunnel member 300 is provided and is omitted.

TABLE 1

| Classification | A case where the center tunnel member is provided | A case where the center tunnel member is omitted | Comparison |
|---|---|---|---|
| Torsional static stiffness, GJ [$10^4$ kg$_f$·m²/rad] | 15.2 | 14.7 | 3.4% increased |
| BIW weight(kg) | 123 | 116 | 7 kg increased |

As shown in the above comparison results, the torsional static stiffness may be increased by about 3.4% with dividing the center tunnel member 300 and then, bonding and connecting the center tunnel member 300 to other members using structural bonding agent as in the present invention. The center tunnel member may be formed of carbon fiber composite materials and may have an excellent surface property to be used as an interior material for a vehicle and a structural stiffness may be equal to or greater than that of steel. Further, a structural design thereof may be possible, which may be difficult to be applied to steel BIW, due to an excellent formation property.

Accordingly, a center console structure may be designed to increase the structural stiffness of a vehicle while maintaining an outer appearance quality as an interior material, using the center tunnel member. The member to become a center tunnel member and simultaneously a center console may be bonded to other members disposed at an under floor of a vehicle to increase a torsional rigidity and further may be disposed at an more upper part of the under floor compared to a conventional center tunnel member to improve a bending rigidity due to the increase of bending moment inertia. Accordingly, a rigidity of a vehicle body may be ensured and weight of the vehicle body may be reduced without adding components made of steel or increasing a thickness thereof to increase the rigidity.

Figure 7:
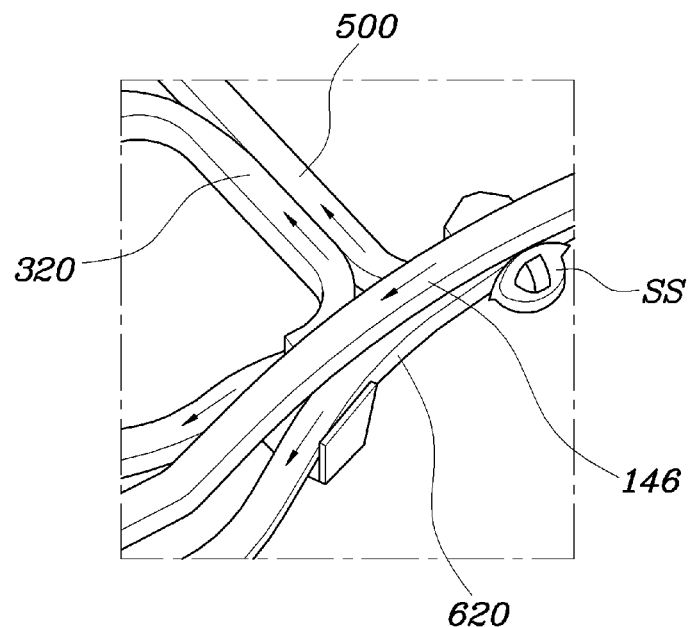
FIGS. 7 to 9 are exemplary views illustrating load transmission procedures based on a spring sheet in an under-floor frame system for a vehicle according to an exemplary embodiment of the present invention, respectively.
Figure 8:
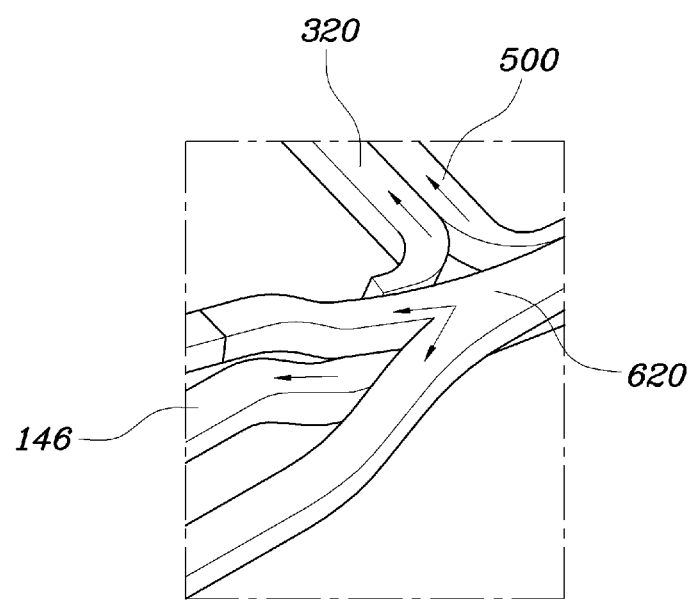
Figure 9:
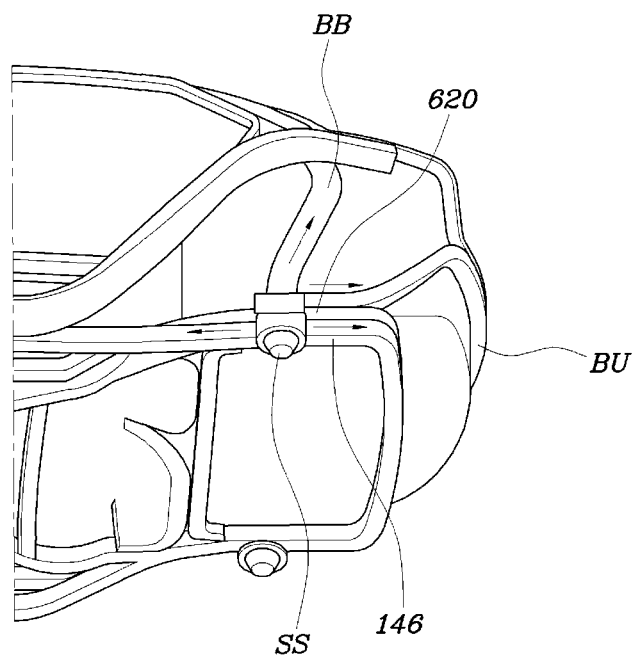

FIGS. 7 to 9 are exemplary views illustrating load transmission procedures based on a spring sheet in an under-floor frame system for a vehicle according to an exemplary embodiment of the present invention, respectively. In the under-floor frame system according to the present invention, as shown in the drawings, the rear end of the additional side member 600 may extend along the rear bumper member 146 of the main frame 100 to form an additional rear member 620 formed of carbon fiber composite materials. In other words, the additional side member 600 may be provided as a pair to correspond to the respective side member 140 wherein the rear end of the respective additional side member 600 may be connected through the additional rear member 620 formed of carbon fiber composite materials or the additional rear member 620 may be formed integrally with the additional side member 600 as in the exemplary embodiment shown in the drawing.

Further, the additional side member 600 may be connected to an outer end of the side member 140. Additionally, the additional rear member 620 may be in close contact (e.g. may be adjacent to) along a lower end of the rear bumper member 146 to be connected thereto. In other words, the side member 140 and the rear bumper member 146 may be connected by being bent to have a height difference and the additional side member 600 may be connected to an outer end of the side member 140 with same height due to the height difference to ensure rigidity with respect to a side collision of a vehicle, and the additional rear member 620 may be connected to a lower end of the rear bumper member 146 to ensure rigidity with respect to a rear collision of a vehicle.

Additionally, a spring sheet SS on which a rear wheel suspension spring is mounted may be connected to a lower end of the additional rear member 620. In particular, the spring sheet SS may be connected to a lower end of the additional rear member 620 where the additional rear member 620 and the rear bumper member 146 may be connected. Meanwhile, a lower end of a C pillar member BB formed of carbon fiber composite materials may be connected to an upper end of the rear bumper member 146 corresponding to the spring sheet SS and simultaneously a bumper main member BU may be connected thereto.

The rear collision paths may be formed safely through this configuration wherein as shown in FIG. 8, at least five load transmission paths may be formed to more prominently disperse the load compared to a conventional vehicle structure. Further, the loads may be efficiently transmitted through the path formed by surface contact, not through the path cut by welding, to the respective member.

According to the present invention, the floor members may be integrally connected to be efficient with respect to a rear collision based on a free formation of carbon fiber composite materials, a rolling of a vehicle may be inhibited, and the impact transmitted to a spring sheet when a vehicle bumps to be efficiently dispersed to ensure the rigidity. Further, the load may be dispersed when a vehicle collides at a rear side and the rigidity may be increased efficiently due to a closed-sectional surface and integration of the members. The members at a rear side of a vehicle may be formed as a dual member bonding structure to enforce a spring sheet and the torsion rigidity and floor rigidity may be increased. Additionally, the corrosion problem due to the additional enforcement material to be applied thereto, which is required in a related art, may be solved to improve durability.

According to the under-floor frame system as configured above, the rigidity may be increased and weight thereof may be reduced using carbon fiber composite materials. Specially, the under-floor frame system may be integrally formed to ensure the continuous rigidity at a connection part and thus discontinuity thereof may be prevented and further advantages in manufacturing the system may be obtained. The load may be efficiently dispersed when a vehicle collides through a free connection property.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An under-floor frame system for a vehicle, comprising:
  a main frame of carbon fiber composite materials that forms a closed quadrangle, a front of the main frame is a front bumper member, both sides of the main frame are side members that extend from a front to a rear of the main frame, and a rear of the main frame is a rear bumper member;
  a front cross member of carbon fiber composite materials that extends along a width direction of a vehicle, and connects the front portion of both side members of the main frame and a rear cross member that connects the rear portion of the side members; and
  an additional side member of carbon fiber composite materials that extends in the length direction of a vehicle, and is connected to the side member of the main frame,
  wherein the rear end of the additional side member extends along the rear bumper member of a main frame, and forms an additional rear member of carbon fiber composite materials, and
  wherein a spring sheet on which a rear wheel suspension spring is seated is connected to the lower end of the additional rear member.

2. The under-floor frame system for a vehicle of claim 1, wherein the additional side member is provided as a pair and the rear end of each additional side member is connected through the additional rear member carbon fiber composite materials, or is formed integrally.

3. The under-floor frame system for a vehicle of claim 1, wherein the additional side member is connected to the outer end of the side member.

4. The under-floor frame system for a vehicle of claim 1, wherein the additional rear member is connected along the lower end of the rear bumper member.

5. The under-floor frame system for a vehicle of claim 4, wherein a spring sheet on which a rear wheel suspension spring is seated is connected to the lower end of the additional rear member where the additional rear member and the rear bumper member are connected.

6. The under-floor frame system for a vehicle of claim 1, wherein the lower end of a C filler member of carbon fiber materials is connected to the upper end of the rear bumper member corresponding to the spring sheet.

* * * * *